June 21, 1955    G. D. PARKER    2,711,021
APICAL IMPLANT
Filed Dec. 24, 1953

INVENTOR.
George D. Parker
BY Victor J. Evans & Co.
ATTORNEYS

United States Patent Office 2,711,021
Patented June 21, 1955

2,711,021
APICAL IMPLANT
George Deming Parker, Monte Vista, Colo.

Application December 24, 1953, Serial No. 400,301

1 Claim. (Cl. 32—1)

This invention relates to dental anatomy, and in particular anchoring means for a natural tooth in which a diseased portion of the root of a tooth is removed and replaced by an apical implant having a thread on the outer surface and in which the implant is adapted to occupy an area from which infected bone structure around the diseased portion of the root has been removed, with the threads of the implant embedded in the bone structure of the alveolus.

The purpose of this invention is to eliminate the necessity of extracting teeth having abscesses on roots thereof.

The purpose is also to use an implant to provide an artificial tissue tolerant root end or apex for a diseased tooth that is extracted, the diseased end of the root amputated, the implant inserted, the diseased tissue removed through the socket or alveolus and, finally, the tooth with the implant cemented in place thereon replanted in the socket from which it was extracted.

The invention, therefore, involves apicoectomy, in which the tooth is not extracted, and also the extraction of the tooth with the extracted tooth treated and the diseased portion replaced with the implant and the replantation of the tooth, either of the processes or procedures being used on the diseased tooth and either performed during one operation. Both operations are not used in the same procedure.

The ordinary dental abscess destroys some bone structure around the apex of the root of a tooth and when this bone structure, infected by the tooth root abscess becomes excessive, the tooth will obviously become loose, due to inadequate support by the bone structure. Prior to the present invention, it was customary to extract the tooth when an abscess was discovered on the root thereof.

In some instances a straight pin has been cemented in the root canal with an end extended from the root, however, the pin is not sufficient to provide supporting means or to overcome hydraulic pressure that builds up in the alveolus following replantation.

With this thought in mind this invention contemplates a support or apical implant adapted to be installed in place of the amputated abscess portion of the root of a tooth that is adapted to reinforce the tooth to compensate for the amputated part of the root and the surrounding bone area that has been removed in eliminating the affected area.

The object of this invention is, therefore, to provide a supporting device for a natural tooth that is adapted to be installed at the end of the root of the tooth, said device having a portion which extends into the root canal so that, with the device so positioned, nature will gradually effect replacement of the bone structure that has necessarily been removed in correcting the abscess.

Another object of the invention is to provide a supporting apical implant that is adapted to be secured to the remaining and healthy portion of the root of a natural tooth from which an abscessed portion has been removed or amputated.

Another important object of the invention is to provide supporting means for retaining a tooth with an apical implant of tissue tolerant material in a root thereof in an alveolus after replantation to compensate for hydraulic pressure that builds up in a socket after replantation.

With these and other objects and advantages in view the invention embodies an apical implant having at one side a conical-shaped portion with threads on the outer surface and at the other side a stem extending therefrom.

Other features and advantages of the invention will appear from the following description taken in connection with the drawing, wherein.

Figure 1:
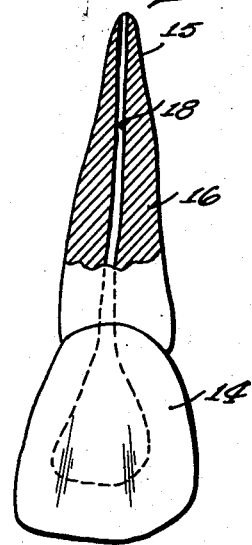
Figure 1 is a front elevational view of a natural tooth, such as an upper central incisor with part of the root shown broken away and in section.
Figure 2:
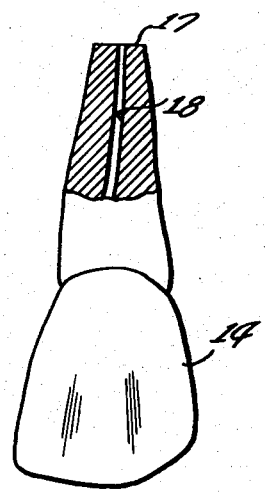
Figure 2 is a front elevational view similar to that shown in Fig. 1 showing the terminal end of the root amputated and formed with a flat surface that is adapted to receive the implant of the present invention.
Figure 3:
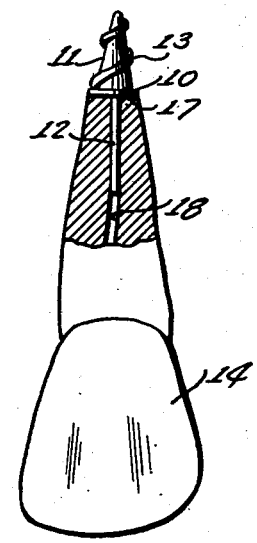
Figure 3 is also a front elevational view, similar to that shown in Fig. 1 showing the implant in position on the end of the root of a tooth which has had its infected end portion removed.
Figure 4:
Figure 4 is a detail showing the implant.

Referring now to the drawing wherein like reference characters denote corresponding parts the improved dental implant of this invention includes a disc-like portion or base 10 having a conical-shaped body 11 extended from one surface and a stem 12 extended from the opposite surface and, as shown in Figs. 3 and 4, the body 11 is provided with an external spiral rib or thread, as indicated by the numeral 13.

With the apical implant of this invention used on a tooth, such, for example, as the upper central incisor, as indicated by the numeral 14 the upper portion 15 of the root 16 which is normally considered as the abscess area, is amputated providing a flat surface 17 at the extended end of the root and, as illustrated in Fig. 3, the disc 10 is positioned upon the flat surface 17 with the stem 12 extended into the root canal, which is indicated by the numeral 18.

With the abscessed portion of the root 16 removed and with the infected area of the bone structure around the tooth also removed, the implant may be installed, either with the tooth in position in the jaw, or with the tooth extracted and replanted in the jaw and with a healthy condition around the implant the bone structure grows back around the implant substantially filling the area from which the infected bone structure has been removed.

By this means an abscess may be completely eliminated and the tooth, on the root of which the abscess existed, rigidly supported in its natural position.

The implant may be made of any suitable material and the stem 12 with the disc or base 10 may be secured to the root of the tooth with a suitable cement or other material.

The apical implant is formed of a tissue tolerant material, and may be inserted with the pin cemented in the root canal during apicoectomy or the tooth may be extracted, the periapical tissue curreted through the alveolus, then the diseased portion of the apex is amputated, the apical implant cemented to the remaining root of the tooth with the pin in the root canal.

Before reinserting the tooth with the implant thereon, it may be necessary to use a surgical bur to enlarge the opening. The bur would be of a smaller diameter than that of the implant whereby, upon inserting the tooth with the implant thereon, the threads are impressed in the bone structure, thereby providing means for overcoming hydraulic pressure within the root socket or alveolus.

It will be understood that modifications, within the scope of the appended claim, may be made in the design and arrangement of the parts without departing from the spirit of the invention.

What is claimed is:

An apical implant for use with a natural tooth, comprising a base portion, a cone-like portion extending outwardly from the base portion in one direction, a stem extending outwardly from the base portion in the opposite direction, and a jawbone socket-engaging spiral external projection on said cone-like portion, the implant base portion being adapted to cover and seal the remaining portion of the tooth root while the stem penetrates the root canal to seal the same, thereby increasing the stability of the natural tooth.

References Cited in the file of this patent
UNITED STATES PATENTS

| | | |
|---|---|---|
| 581,335 | Carr | Apr. 27, 1897 |
| 2,609,604 | Sprague | Sept. 9, 1952 |